US009659387B2

(12) United States Patent
Yue et al.

(10) Patent No.: US 9,659,387 B2
(45) Date of Patent: May 23, 2017

(54) GRAPHICS PRIMITIVE AND COLOR CHANNELS

(71) Applicant: MICROSOFT TECHNOLOGY LICENSING, LLC, Redmond, WA (US)

(72) Inventors: Feng Yue, Sammamish, WA (US); Justin A. Hutchings, Issaquah, WA (US); Pradeep Mayakontla, Bellevue, WA (US); Erik O. Peterson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 14/485,422

(22) Filed: Sep. 12, 2014

(65) Prior Publication Data
US 2016/0078644 A1 Mar. 17, 2016

(51) Int. Cl.
| G06T 11/00 | (2006.01) |
| G06K 15/02 | (2006.01) |
| G06T 1/20 | (2006.01) |
| G09G 5/02 | (2006.01) |
| G06T 11/40 | (2006.01) |

(52) U.S. Cl.
CPC ........ *G06T 11/001* (2013.01); *G06K 15/1878* (2013.01); *G06T 1/20* (2013.01); *G06T 11/40* (2013.01); *G09G 5/02* (2013.01); *G06T 2210/32* (2013.01)

(58) Field of Classification Search
None
See application file for complete search history.

(56) References Cited

U.S. PATENT DOCUMENTS

| 5,638,498 A | * | 6/1997 | Tyler | ...................... G06K 15/00 358/1.16 |
| 5,991,515 A | * | 11/1999 | Fall | .......................... G06T 9/00 358/1.12 |
| 6,429,950 B1 | * | 8/2002 | Ebner | .................... G06K 15/02 358/1.16 |

(Continued)

FOREIGN PATENT DOCUMENTS

| EP | 0694881 A2 | 1/1996 |
| EP | 1548634 B1 | 10/2011 |

OTHER PUBLICATIONS

Bottou, et al., "Efficient Conversion of Digital Documents to Multilayer Raster Formats", In Proceedings of the Sixth International Conference on Document Analysis and Recognition, Sep. 10, 2001, 5 pages.

(Continued)

*Primary Examiner* — Tsung-Yin Tsai
(74) *Attorney, Agent, or Firm* — Workman Nydegger (57) ABSTRACT

Graphics primitive and color channel techniques are described. In one or more implementations, image data is processed by a computing device to form a plurality of pixels and corresponding one or more color channels usable to define a color for a respective said pixel. A graphics primitive type is identified by the computing device associated with one or more of the pixels in the processed image data. The graphics primitive type is assigned by the computing device to the one or more pixels using at least one color channel.

23 Claims, 7 Drawing Sheets

(56) References Cited

U.S. PATENT DOCUMENTS

| | | | |
|---|---|---|---|
| 6,470,381 B2* | 10/2002 | De Boor | H04M 1/274558 |
| | | | 707/999.01 |
| 7,019,864 B2 | 3/2006 | Delhoune et al. | |
| 7,519,899 B2 | 4/2009 | Foehr et al. | |
| 7,616,342 B2 | 11/2009 | Laman et al. | |
| 8,169,649 B2 | 5/2012 | Chang et al. | |
| 8,824,011 B2* | 9/2014 | Luttmer | G06K 15/1878 |
| | | | 358/1.9 |
| 2004/0161146 A1* | 8/2004 | Van Hook | H04N 1/644 |
| | | | 382/166 |
| 2005/0035976 A1* | 2/2005 | Ecob | G06T 15/503 |
| | | | 345/611 |
| 2009/0174898 A1 | 7/2009 | Ono | |
| 2010/0214614 A1 | 8/2010 | Ferlitsch et al. | |
| 2011/0069885 A1 | 3/2011 | Malik et al. | |
| 2012/0288211 A1 | 11/2012 | Hitosugi | |
| 2014/0133748 A1* | 5/2014 | Wright | G06T 11/40 |
| | | | 382/167 |
| 2015/0015574 A1* | 1/2015 | Prahalad | G06T 11/001 |
| | | | 345/420 |

OTHER PUBLICATIONS

"International Search Report and Written Opinion Issued in PCT Patent Application No. PCT/US2015/049541", mailed Date: May 3, 2016, 18 pages.

"International Preliminary Report on Patentability Issued in PCT Application No. PCT/US2015/049541", Mailed Date: Nov. 8, 2016, 12 Pages.

"Second Written Opinion Issued in PCT Application No. PCT/US2015/049541", Mailed Date: Aug. 26, 2016, 12 Pages.

* cited by examiner

GRAPHICS PRIMITIVE AND COLOR CHANNELS

BACKGROUND

Image data such as vectorized documents may be configured to include a variety of content. The content, for instance, may include graphics primitives such as image graphics primitives, text, brush strokes, and so forth. Conventional techniques utilized to rasterize image data, however, do not distinguish between these types of graphics primitives in the image data as there is no established conventional mechanism for discerning the origins of the image data via the image encoding.

Consequently, conventional consumers of this rasterized image data typically treated the image data in a single manner when rendering the content, e.g., to treat an image graphics primitive the same as a text graphics primitive. Consequently, these conventional techniques often involved a balancing between types of content for rendering, the problems of which could be exacerbated when confronted with a variety of content in a single set of image data.

SUMMARY

Graphics primitive and color channel techniques are described. In one or more implementations, image data is processed by a computing device to form a plurality of pixels and corresponding one or more color channels usable to define a color for a respective pixel. A graphics primitive type is identified by the computing device associated with one or more of the pixels in the processed image data. The graphics primitive type is assigned by the computing device to the one or more pixels using at least one color channel.

In one or more implementations a system includes one or more modules implemented at least partially in hardware. The one or more modules are configured to perform operations that include receiving image data having a plurality of color channels that define colors to be used for respective pixels in the image data and at least one color channel defining a type of graphics primitive in which the respective pixels are included. The operations also include rendering the pixels of the image data based at least in part on the defined type of graphics primitive for the pixels and the defined colors as described by the plurality of color channels.

In one or more implementations, a system includes one or more modules implemented at least partially in hardware. The one or more modules are configured to perform operations that include determining a graphics primitive type associated with a plurality of pixels in image data and assigning the graphics primitive type to the plurality of pixels using at least one of a plurality of color channels, the plurality of color channels also defining a color for respective one of the plurality of pixels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Graphics primitives and color channel techniques are described. In one or more implementations, techniques are described to rasterize image data (e.g., a vectorized documents) that includes identification of types of graphics primitives in the rasterized image data, such as image graphic primitives (e.g., a captured photo), text, glyphs, vectors, and other types of graphics primitives such as stroked brush lines that mimic a painted brush stroke. The image data, for instance, may be processed to form a plurality of pixels and utilize corresponding color channels to describe colors of the pixels, e.g., red, green, and blue channels. The image may also be processed to utilize another color channel to describe a type of graphics primitive (e.g., primitive document construct) associated with the pixel. In this way, subsequent rendering of the pixels in the image may be performed in a manner that is aware of what is represented by each of the pixels.

The graphics primitive and color channel techniques, for instance, may thus address quality issues associated with printing or displaying rasterized image content. Because content in a conventional rasterized image is formed solely as a collection of colored pixels, it was not possible using conventional techniques for a user to optimize the display of image data for factors like legibility in the current ambient light, contrast (e.g., for visually impaired individuals), printer ink selections (e.g., composite black vs true black ink/toner), or ink density to be applied to a page of the image data. However, by utilizing the techniques described herein these optimizations are made possible through identification of "what" graphics primitive is represented by the pixel.

Further discussion of these and other examples may be found in the following sections. In the following discussion, use of "primitives" also refers to "graphics primitives".

In the following discussion, an example environment is first described that may employ the graphics primitive and color channel techniques described herein. Example procedures are then described which may be performed in the example environment as well as other environments. Consequently, performance of the example procedures is not limited to the example environment and the example environment is not limited to performance of the example procedures.

Example Environment

Figure 1:
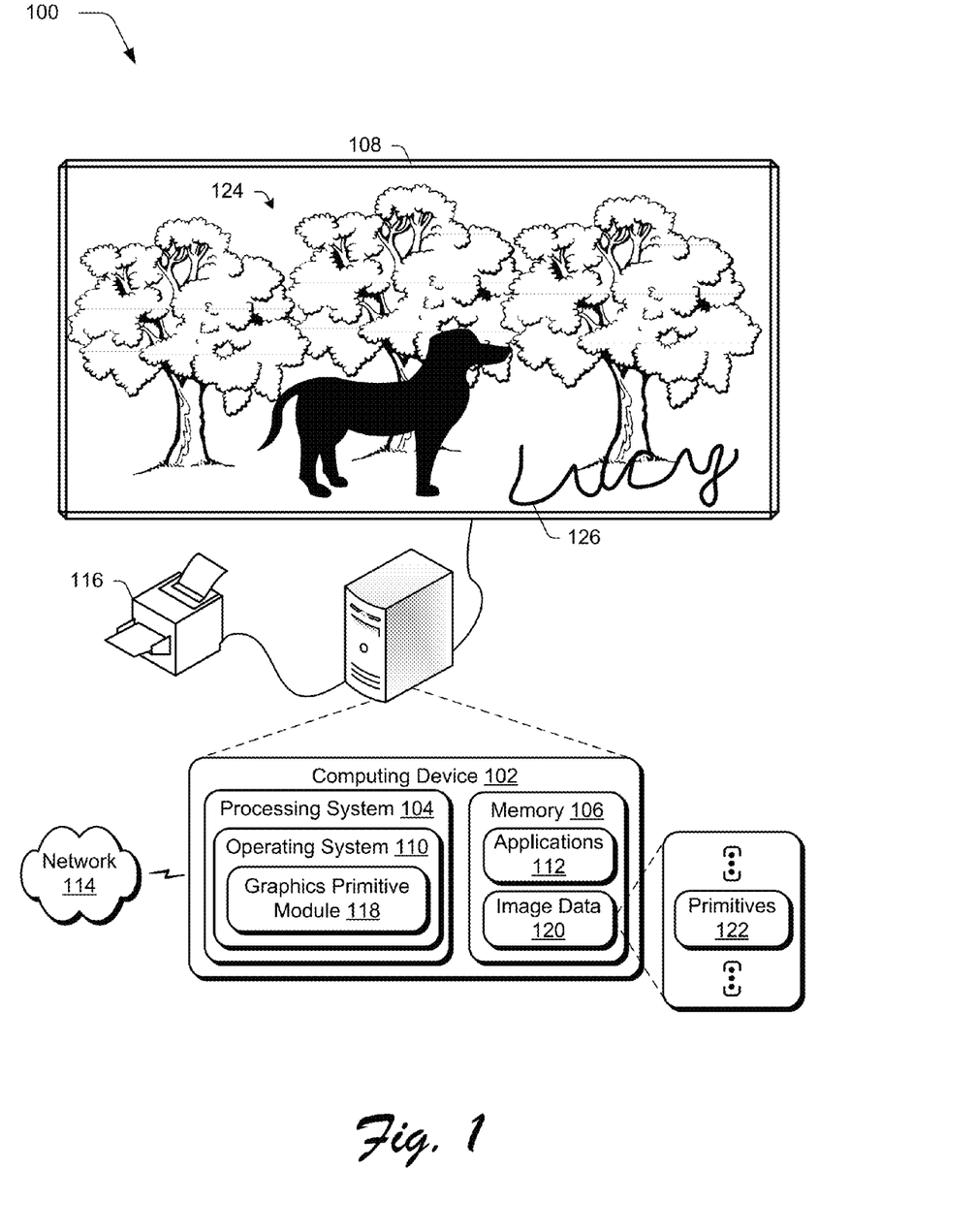
FIG. 1 is an illustration of an environment in an example implementation that is operable to perform graphics primitive and color channel techniques.

FIG. 1 is an illustration of an environment 100 in an example implementation that is operable to employ the graphics primitive and color channel techniques described herein. The illustrated environment 100 includes a computing device 102, which may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, and so forth.

Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 is illustrated as including a variety of hardware components, examples of which include a processing system 104, an example of a computer-readable storage medium illustrated as memory 106, a display device 108, and so on. The processing system 104 is representative of functionality to perform operations through execution of instructions stored in the memory 106. Although illustrated separately, functionality of these components may be further divided, combined (e.g., on an application specific integrated circuit), and so forth without departing from the spirit and scope thereof.

The computing device 102 is further illustrated as including an operating system 110. The operating system 110 is configured to abstract underlying functionality of the computing device 102 to applications 112 that are executable on the computing device 102. For example, the operating system 110 may abstract functionality of hardware components such as the processing system 104, memory 106, network 114, and/or display device 108 as well as software functionality of the computing device 102 such that the applications 112 may be written without knowing "how" this underlying functionality is implemented. The application 112, for instance, may provide data to the operating system 110 to be rendered and displayed by the display device 108 or printer 116 without understanding how this rendering will be performed. The operating system 110 may also represent a variety of other functionality, such as to manage a file system and user interface that is navigable by a user of the computing device 102.

An example of the abstracted functionality of the operating system 110 is represented as a graphics primitive module 118. Although illustrated as part of the operating system 110, functionality of the graphics primitive module 118 may be implemented in a variety of other ways, such as a standalone module, in hardware, as part of the applications 112, and so forth.

The graphics primitive module 118 is representative of functionality of the computing device 102 relating to identification, encoding, and decoding image data 120 through leveraging graphics primitives 122 included in the image data 120. An example of the image data 120 is displayed by the display device 108, e.g., a display of a vectorized document. The image data 120 in this example includes an image graphics primitive 124 depicting a forest scene with a dog, e.g., as captured by an image capture device (e.g., camera), virtually generated by a user, and so forth. The image data 120 also includes a brush stroke primitive 126, such as a drawing of text detected by touchscreen functionality of the display device 108 from a finger of a user's hand, a stylus, and so forth. Other examples of graphics primitives may also be included in the image data 120 as further described in relation to FIG. 2. Thus, the image data 120 may include a variety of different types of graphics primitives 122. As previously described, conventional techniques utilized to render such graphics primitives did not support a distinction between what was being represented by the pixels, e.g., the image graphics primitive 124 and the brush stroke primitive 126.

The graphics primitive module 118, however, may support a variety of functionality by exposing knowledge of the graphics primitives 122 included in image data 120, such as to address quality issues associated with rendering rasterized image content by a display device 108 and/or printer 116. As previously described, because content in rasterized image data 120 is formed solely as a collection of colored pixels, it is not possible using conventional techniques for optimization of the image data 120 for factors like legibility in the current ambient light, contrast for visually impaired individuals, printer ink selections (composite black vs true black ink/toner), or ink density which should be applied to the page, and so on.

However, by describing primitives 122 as part of image data 120, the graphics primitive module 118 may support an image format that describes the type of content being described by a pixel by association with a graphics primitive 122 such as a brush stroke primitive 126 of the image data 120 in the illustrated example. The printer 116, for instance, may use this knowledge to vary the amount of toner, to choose different types of ink such as "photo black" instead of "black" for an image graphics primitive 124, and so forth. In the case of display technologies, the display device 108 may change the contrast of the rendered image data 120, apply different kinds of sub-pixel rendering for certain kinds of content in order to maximize readability, and so forth. Further description of image data 120 and primitives 122 may be found in the following discussion and is shown in a corresponding figure.

Figure 2:
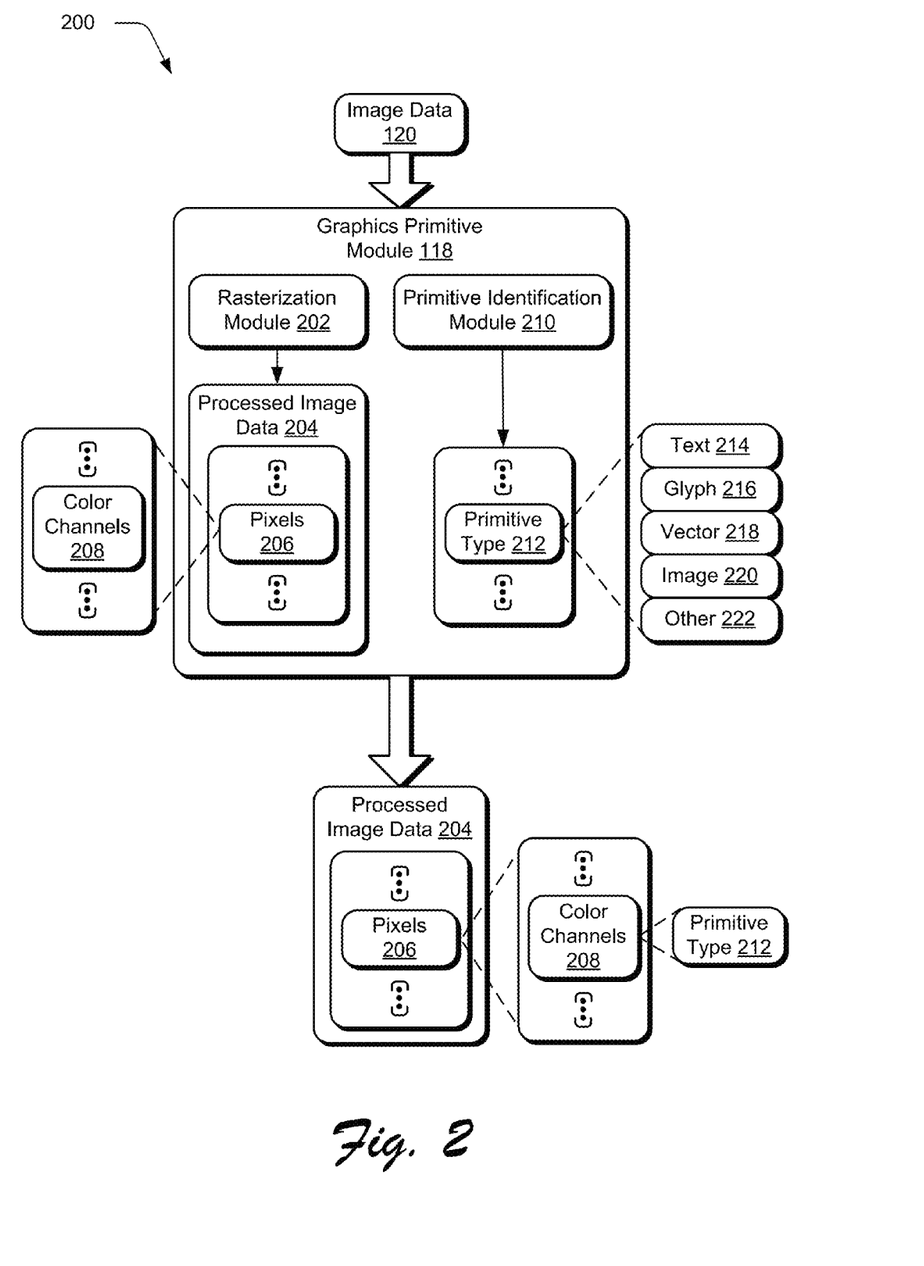
FIG. 2 depicts a system in an example implementation showing an graphics primitive module of FIG. 1 in greater detail as encoding a graphics primitive type as part of image data.

FIG. 2 depicts a system 200 in an example implementation showing the graphics primitive module 118 of FIG. 1 in greater detail as encoding a graphics primitive type as part of image data 120. In this example, the graphics primitive module 118 is configured to determine the graphics primitive 122 type for a pixel that was generated by rasterizing image data 120, e.g., a vectorized document or image, and encode this graphics primitive type as part of color encoding for a bitmap-based image format, page description language, and so on.

The graphics primitive module 118, for instance, may receive image data 120 that is to be rasterized for rendering by a display device 108 or printer 116 as described previously. The image data 120 may take a variety of forms, such as a vector document or other types of documents, images, files, and so forth that specify a type of graphics primitive.

A rasterization module 202 is then employed to rasterize the image data 120 for output. The rasterization module 202, for instance, may be configured to convert the format of the image data 120 into a processed image data 204 having a plurality of pixels 206. Additionally, a color of each of the pixels 206 may be described using one or more color channels 208, such as red, green, blue (RGB) color channels; cyan, magenta, yellow, and another color such as black (CMYK) color channels; hue saturation value color channels; include use of an alpha channel to store transparency information; and so forth.

A primitive identification module 210 may then be employed by the graphics primitive module 118 to identify graphics primitives 122 included in the image data 120. The image data 120, for instance, may be configured to define graphics primitive types 212 itself. Vector documents, for instance, may include defined graphics primitive types such as text 214, glyphs 216, vector 218, image 220 graphics primitives, or other 222 types (e.g., stroked brush/line) as part of the image data 120. Other examples are also contemplated, such as text encoded as glyphs as part of a Portable Document Format (PDF).

Therefore, the primitive identification module 210 may utilize this identification as part of the image data 120 to locate objects in the image data 120 of that type and identify corresponding pixels 206 of the processed image data 204 as such. In this way, the pixels 206 in the processed image data 204 may have a corresponding graphics primitive type assigned to those pixels such that renderers (e.g., graphics processing units, display devices 108, printers 116, and so on) may know "what" is being represented by the pixels 206.

Identification of the graphics primitive type 212 may be performed in a variety of ways. The processed image data 204, for instance, may be configured in a bitmap based image format having colors assigned for pixels 206 using color channels 208 as previously described. This convention may be extended to include another color channel that is utilized to identify a graphics primitive type 212 for respective pixels 206. For example, pixels of a particular graphics primitive type 212 in the processed image data 204 may be mapped to a particular "color" of the color channel 208 used to identify the graphics primitive type 212. In this way, image data 120 (such as a vector document) may be rasterized to isolate a particular kind of graphics primitive type (e.g., primitive document construct) and combined into a single metadata encoded rasterized, bitmap document, an example of which is shown as processed image data 204 output by the graphics primitive module 118.

For standard Red, Green, Blue (sRGB) image data, which is encoded at eight bits per channel that have twenty four bits of color information built in, the same sRGB image data may be encoded using an additional color channel for metadata that describes the graphics primitive type 212, e.g., which may be used to describe eight bit flags of concurrent metadata, $2^8$ possible unique types for the content in each pixel 206, and so forth. Thus, in this example the graphics primitive type 212 may be combined as part of the color channels 208 to describe a color of the pixels in the processed image data 204 as well as the graphics primitive type 212 of the pixels 206. Techniques may also be utilized to improve efficiency in rendering of the processed image data, examples of which may be found in the following discussion and are shown in a corresponding figure.

Figure 3:
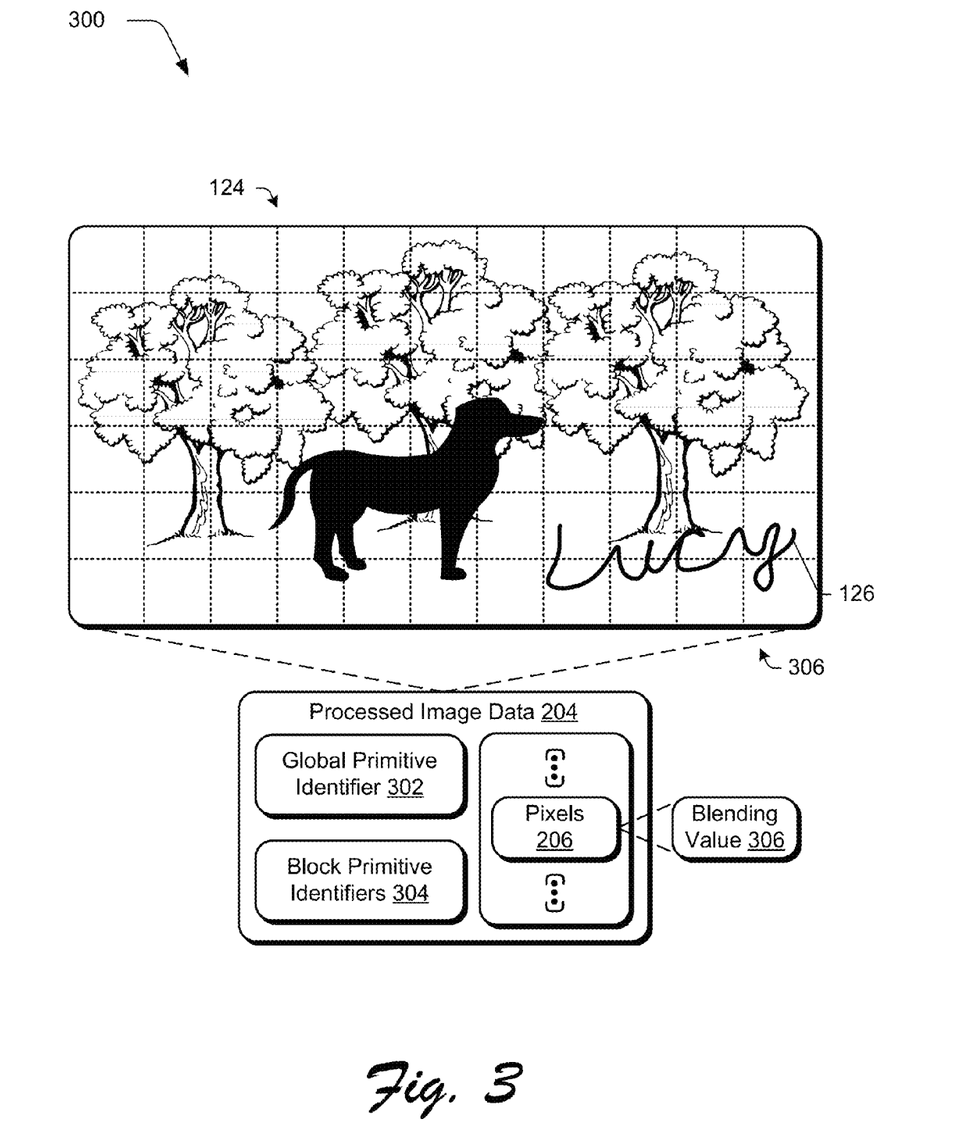
FIG. 3 depicts a system in an example implementation in which identifiers are associated with processed image data that are indicative of primitives included in the processed image data.

FIG. 3 depicts a system 300 in an example implementation in which identifiers are associated with processed image data 204 that are indicative of graphics primitives included in the processed image data 204. In this example, the processed image data 204 includes pixels 206 as before and an illustrated example of which includes the forest scene with the dog of the image graphics primitive 124 and a brush stroke primitive 126 in which a name is drawn.

The processed image data 204 in this example also includes, associated therewith, a global primitive identifier 302 and block primitive identifiers 304. The global primitive identifier 302 is representative of an indication associated with the processed image data 204 to indicate, globally, primitives associated with the processed image data 204 as a whole, e.g., per page. For example, the global primitive identifier 302 may support a technique for encoding a per-page/per-graphics primitive type where the content does not vary. In a system where information is desired as to whether there is text on a page of the processed image data 204 and there is none, for instance, the header of the page or image may include metadata which describes the page as solely including particular types of graphics primitives. In this way, inclusion of additional metadata in the color encoding of each pixel when the content of the processed image data 204 is of the same graphics primitive type may be avoided, e.g., avoid use of an additional color channel thereby conserving computing device 102 resources.

Similar functionality may be employed on a block-by-block basis as represented by the block primitive identifiers 304. As illustrated for the processed image data 204, for instance, a collection 306 of eight blocks includes image graphics primitives 124 and brush stroke primitives 126 (e.g., at different layers) whereas each of the other blocks in the processed image data 204 include image graphics primitives 124, solely. Thus, like above inclusion of additional metadata in the color encoding of each pixel when the content of the processed image data 204 is of the same graphics primitive type for that block may be avoided, e.g., avoid use of an additional color channel thereby conserving computing device resources. Although generally square blocks are illustrated in phantom in the figure, it should be readily apparent that the blocks may assume a variety of shapes and sizes, e.g., formed as a series of horizontal bands of the processed image data 204.

The pixels 206 may also have blending values 306 associated therewith that indicate an amount of contribution of different graphics primitives in forming the pixel. The processed image data 204, for instance, may include multiple layers such that the graphics primitive 124 is on a layer separate from the brush stroke primitive 126. The graphics primitive module 118 may thus examine the different graphics primitives to assign a blending value 306 that is indicative of the contributions of the layers, which may be communicated as part of the processed image data 204. In another example, the blending value 306 may be utilized along with a threshold to assign a graphics primitive type 212 to the pixels 206, e.g., to assign a single graphics primitive type 212, to define whether a contribution is large enough to be considered in defining a graphics primitive type, and so forth for the pixels 206.

Figure 4:
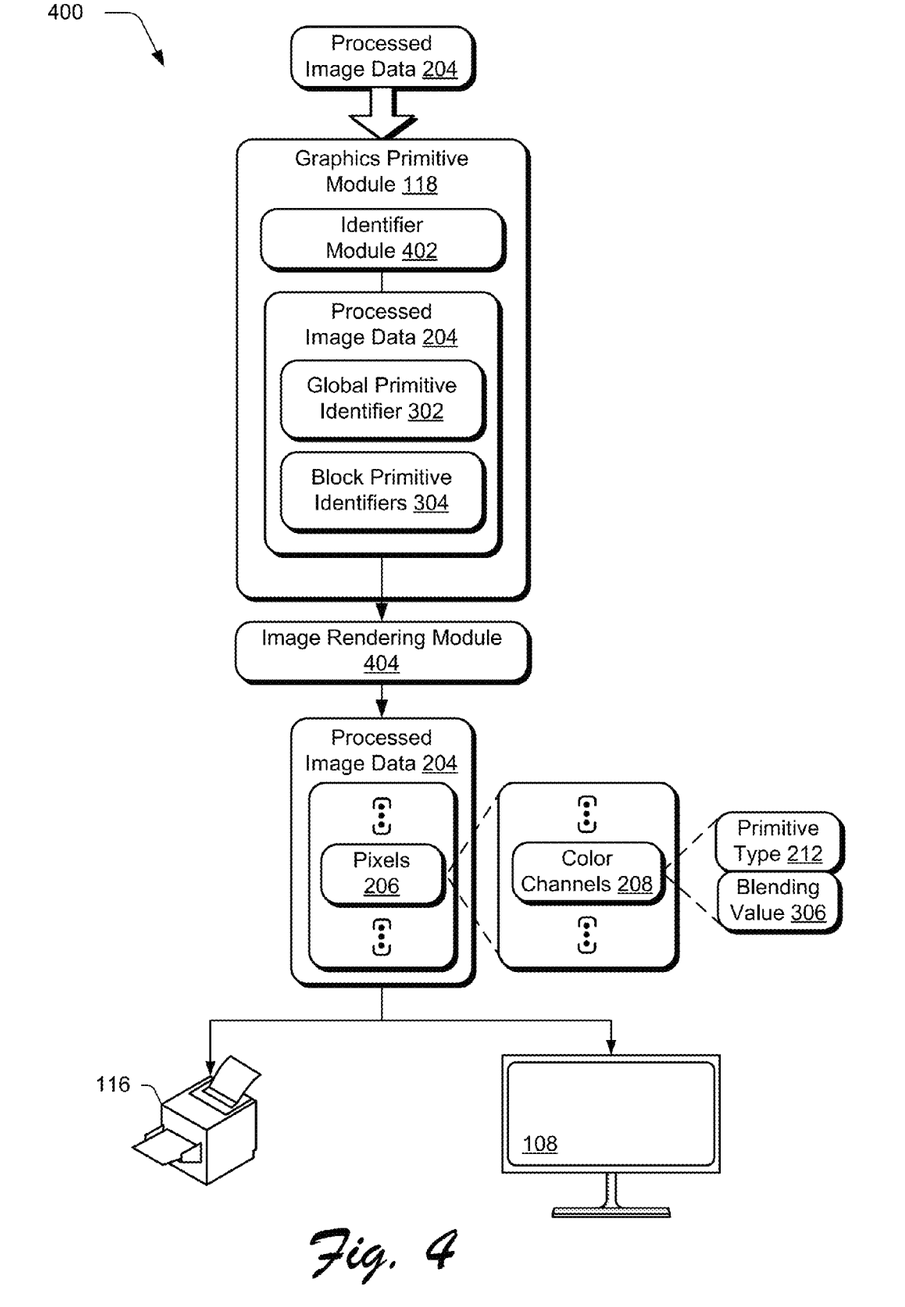
FIG. 4 depicts a system in an example implementation showing the graphics primitive module of FIG. 1 in greater detail as decoding image data for rendering having defined pixels and associated graphics primitive types.

FIG. 4 depicts a system 400 in an example implementation showing the graphics primitive module 118 of FIG. 1 in greater detail as decoding image data 120 for rendering having defined pixels 206 and associated graphics primitive types 212. The graphics primitive module 118 in this example is illustrated as receiving the processed image data 204 of FIG. 3.

The graphics primitive module 118 may then employ an identifier module 402 to identify whether the processed image data 204 includes global primitive identifiers 302, block primitive identifiers 304, and react accordingly. For example, in a situation in which a renderer is interested in optimizing text on a page of the processed image data 204, the header of the page may include the global primitive identifier 302 as metadata which describes the page as including text, as an image graphics primitive only, and so on. In this way, processing of the processed image data 204 may be skipped further in such an instance where a desired graphics primitive type is not included, may be performed when a desired graphics primitive type is included, and so on. Similar techniques may be utilized in processing of blocks based on block primitive identifiers 304.

The processed image data 204, if containing graphics primitive types of interest, may then be processed as part of rendering by an image rendering module 404 for output by a printer 116 or display device 108 in a manner that leverages graphics primitive types 212 specified for pixels 206 in the processed image data 204, may leverage a blending value 306 to determine a contribution of graphics primitive types 212, and so on. The printer 116, for instance, may use this knowledge to vary the amount of toner, to choose different types of ink such as "photo black" instead of "black" for an image graphics primitive 124, and so forth. In the case of display technologies, the display device 108 may change the contrast of the rendered image data 120 for different graphics primitives, apply different kinds of sub-pixel rendering for certain kinds of content in order to maximize readability, and so forth.

Example Procedures

The following discussion describes graphics primitive and color channel techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-4 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 5:
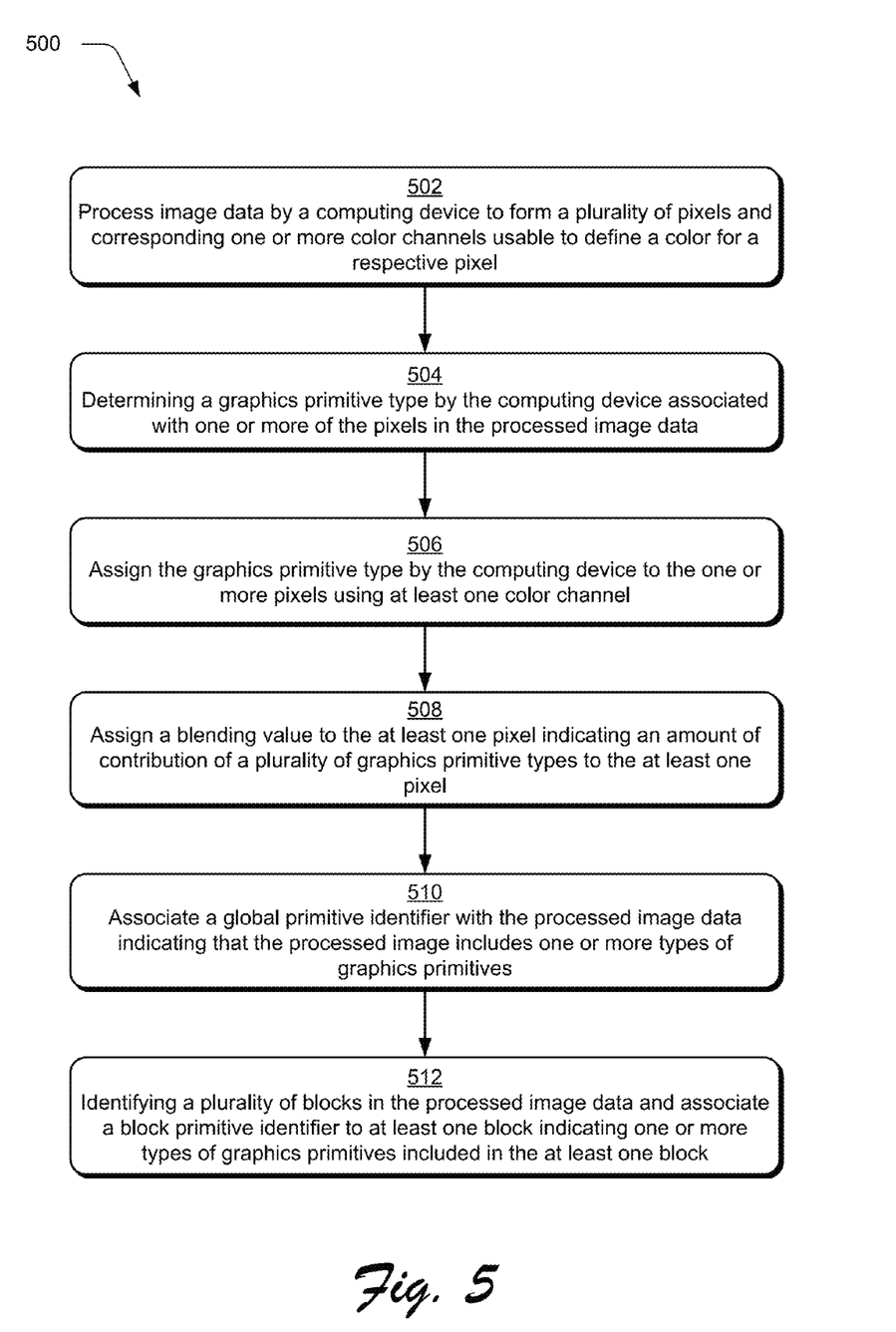
FIG. 5 is a flow diagram depicting a procedure in an example implementation in which image data is processed such that pixels have a corresponding indication of one or more graphics primitive types.

FIG. 5 depicts a procedure 500 in an example implementation in which image data is processed such that pixels have a corresponding indication of one or more graphics primitive types. Image data is processed by a computing device to form a plurality of pixels and corresponding one or more color channels usable to define a color for a respective pixel (block 502). The image data, for instance, may be configured as a vectorized document and processed by a graphics primitive module 118 into a bitmap or page description language having a plurality of pixels, each having a color defined by color channels such as sRGB.

A graphics primitive type is determined by the computing device that is associated with one or more of the pixels in the processed image data (block 504). Continuing with the previous example, the graphics primitive module 118 may examine the vector document in a "second pass" of a rasterization process to determine one or more graphics primitive types associated with each pixel, such as whether the pixel is associated with text (e.g., a glyph), vector, image graphics primitive, or other graphics primitive type 212.

The graphics primitive type is associated by the computing device to the one or more pixels using at least one color channel (block 506). The graphics primitive module 118, for instance, may associate different graphics primitive types with different "colors" of an additional color channel to have those colors represent the graphics primitive types. These "colors" representing the graphics primitive types in this additional channel may then be utilized to assign a type of graphics primitive to an associated pixel.

A blending value may also be assigned to the at least one pixel indicating an amount of contribution of a plurality of graphics primitive types to the at least one pixel (block 508). The blending value may then be used as part of a rendering process, such as to decide how to represent the pixel, e.g., is the pixel "text enough" through use of a threshold for a text optimization feature.

For example, in 8-bit sRGB, a blue pixel which is not text may be encoded as "0x0000FF," whereas, in the custom color format which includes metadata, it may be encoded as "0x0000FF01," which could indicate text primitives, or "0x0000FF02" which may indicate image graphics primitives, and so on. Additionally, a blending value may describe a ratio of an alpha blend between two different items. For example, the first 4-bits of the metadata channel may be defined as a blend ratio, and the second 4 bits as being the content type. In this case, a blue pixel which is a 50% blend of text and image may be represented as "0x0000FF83."

The graphics primitive module 118 may also identify collections of pixels of the image and corresponding graphics primitive types. For example, a global primitive identifier may be associated with the processed image data indicating that the processed image includes one or more types of graphics primitives (block 510). In this way, during rendering if an optimization process is configured for a specific graphics primitive type, and that type is not included in a page, that page may be skipped from further processing, thereby conserving resources of the computing device 102. In a similar manner, a plurality of block in the processed image may be identified and a block primitive identifier associated with at least one of the blocks indicating one or more types of primitive included in the at least one block (block 512). Thus, a rendering process and even an encoding process may use these indications to determine whether to employ color channels to indicate graphics primitive types for that block in an encoding scenario, whether to perform optimization in a rendering scenario, and so on. Thus, in this example the global and block primitive identifiers may be utilized to improve rendering efficiency. As previously described, these identifiers may also be utilized to improve encoding efficiency, such as to identified blocks or even pages of a vectorized documents as a whole to determine whether to employ encoding (e.g., use of the additional color channel) for those blocks. Thus, in such an instance these functions may be performed initially by the graphics primitive module 118 before the functions of Blocks 502-508.

Figure 6:
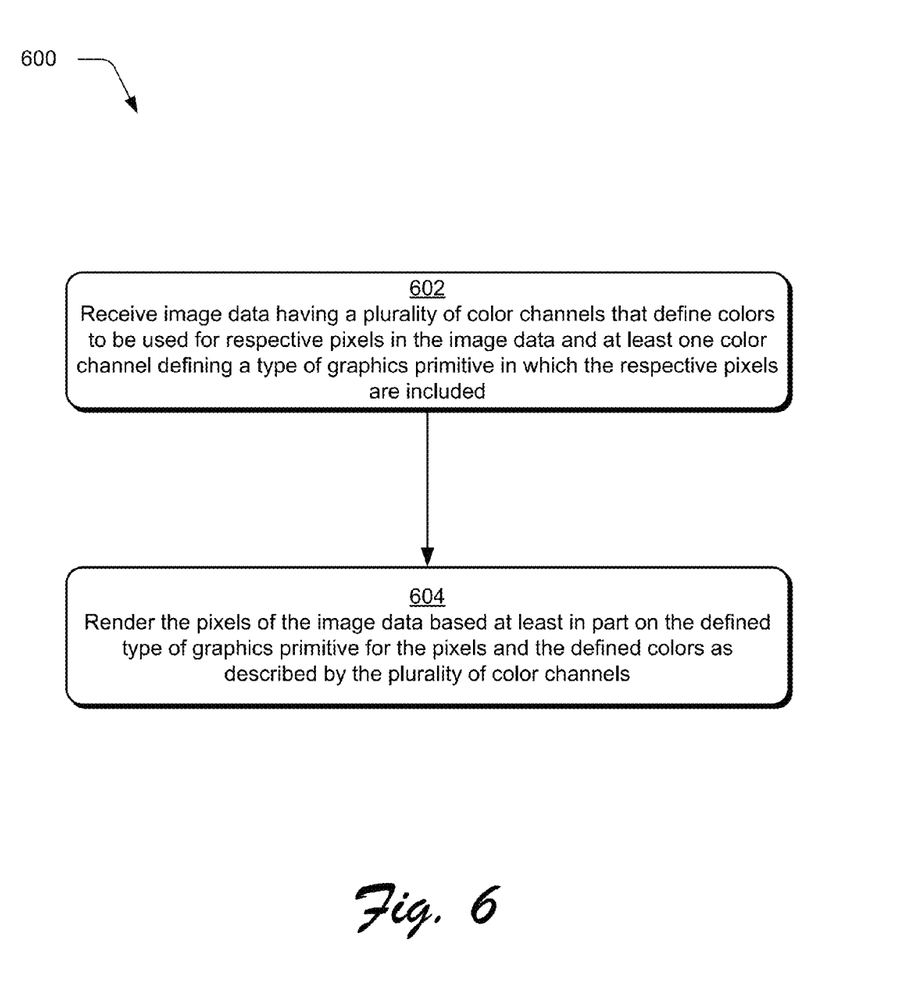
FIG. 6 is a flow diagram depicting a procedure in an example implementation in which image data that includes indications of graphics primitive types is rendered.

FIG. 6 depicts a procedure 600 in an example implementation in which image data that includes indications of graphics primitive types is rendered. Image data is received having a plurality of color channels that define colors to be used for respective pixels in the image data and at least one color channel defining a type of graphics primitive in which the respective pixels are included (block 602). As described previously, the color channels in the image data may be utilized to describe a color associated with the pixel as well as a type of graphics primitive, in which, the pixel is included, such as text, a glyph, vector, image, or other graphics primitive type 212.

The pixels of the image data are rendered based at least in part on the defined type of graphics primitive for the pixels and the defined colors as described by the plurality of color channels (block 604). The printer 116, for instance, as part of rendering (e.g., by a driver or hardware associated with the printer 116) may use this knowledge to vary the amount of toner, to choose different types of ink such as "photo black" instead of "black" for an graphics primitive 124, and so forth. In the case of display technologies, the display device 108 may change the contrast of the rendered image data 120, apply different kinds of sub-pixel rendering for certain kinds of content in order to maximize readability, and so forth. A variety of other optimizations are also contemplated without departing from the spirit and scope thereof.

General Approach Pseudocode

The following is an example of pseudocode as describing a general approach to use of primitives.

```
PrimitivesToMark = {text, image}
If (document contains PrimitivesToMark) {
    For each region of the vector document which supports region-level
    metadata {
        Take region
        If (region contains PrimitivesToMark) {
            For each primitive in region {
                If primitive in PrimitivesToMark {
                    Store bounds of primitive to
MarkedBoundaries
                }
            }
            Set region color encoding to include metadata channel
            ColorizedRaster = Rasterize at target DPI
            MetadataRaster = Rasterize using primitive -> color
mapping at target DPI
            For each pixel in ColorizedRaster {
                If (pixel is in MarkedBoundaries)
                    MergedRaster[pixel]              =
                    CombinePixels(ColorizedRaster[pixel],
                    MetadataRaster[pixel])
                } Else {
                    MergedRaster[pixel]              =
ConvertPixelToDefaultEncoding(ColorizedRaster[pixel])
                }
            }
            Write output
        } else {
            Mark region as default type
            Set region as default color encoding
            Rasterize region at target DPI
            Write output
        }
    }
} else {
    Mark document and/or regions as default type
    Mark document and/or regions as default color encoding
    Rasterize document or regions at target DPI
    Write output
}
```

Example of the General Approach Applied to Printing

The following is an example of pseudocode as describing a general approach to use of primitives above as applied to printing. An example printer description language, PWG Raster [PWG-5102.4-2012] supports page-level metadata about the image encodings, so the smallest region usable in such an example that may be optimized is for a full page. Other industry standards like PCLm [WFA WFDS-Print v1.0] use bands which are encoded individually, so optimization may happen per-band by leveraging the techniques described herein.

```
PrimitivesToMark = {text}
If (document contains PrimitivesToMark) {
    For each page {
        If (page contains PrimitivesToMark) {
            For each primitive in page {
                If primitive in PrimitivesToMark {
                    Store bounds of primitive to
MarkedBoundaries
                }
            }
            Set page color encoding to include metadata channel
            ColorizedRaster = Rasterize at target DPI
            MetadataRaster = Rasterize using primitive -> color
mapping at target DPI
            For each pixel in ColorizedRaster {
                If (pixel is in MarkedBoundaries)
                    MergedRaster[pixel]              =
                    CombinePixels(ColorizedRaster[pixel],
                    MetadataRaster[pixel])
                } Else {
                    MergedRaster[pixel]              =
ConvertPixelToDefaultEncoding(ColorizedRaster[pixel])
                }
            }
            Write output
        } else {
            Mark page as default type
            Set page as default color encoding
            Rasterize page at target DPI
            Write output
        }
    }
} else {
    Mark all pages as default type
    Mark all pages as default color encoding
    Rasterize document or regions at target DPI
    Write output
}
```

Example System and Device

Figure 7:
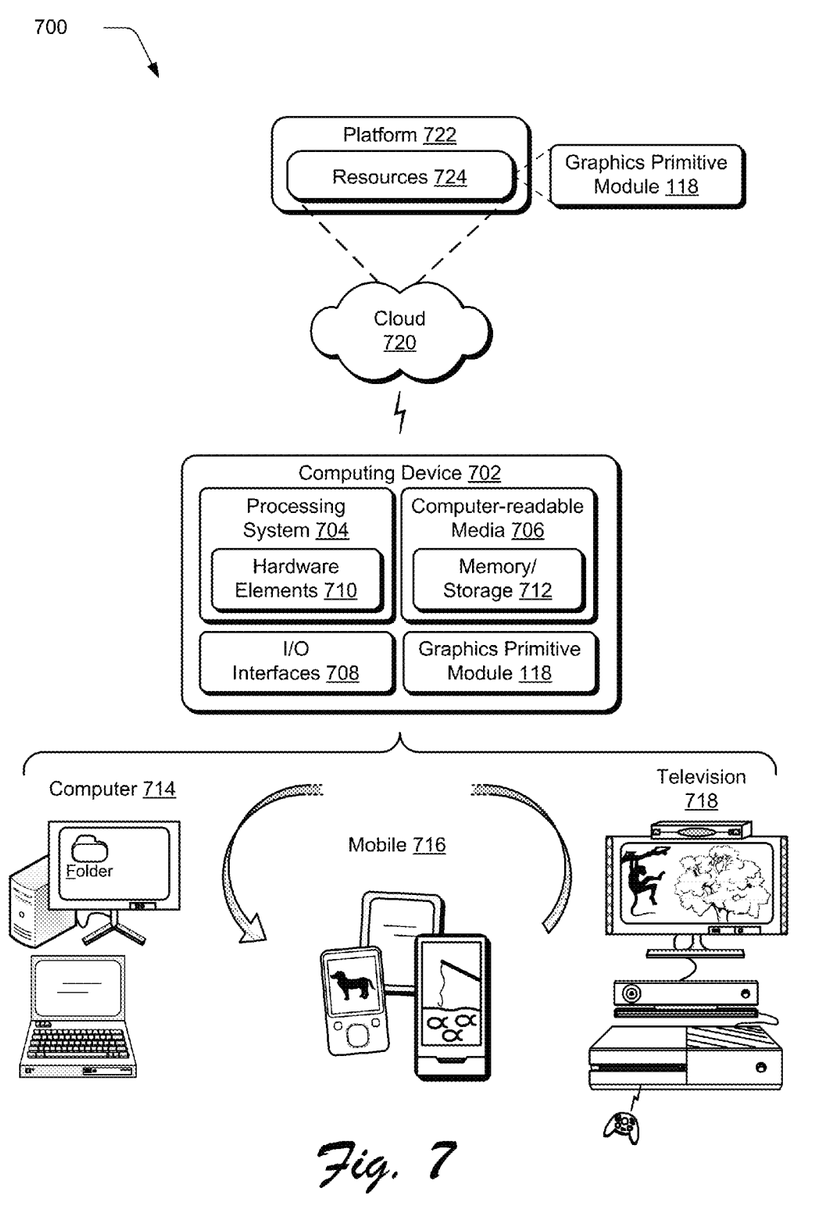
FIG. 7 illustrates an example system including various components of an example device that can be implemented as any type of computing device as described with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. An example of this is illustrated through inclusion of the graphics primitive module 118. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method performed by a computing device, the method comprising:
   processing image data to form a plurality of pixels, wherein each pixel in the plurality of pixels has associated therewith one or more color channels that define a resulting color for said each corresponding pixel in the plurality of pixels;
   using the processed image data to determine a graphics primitive type that is associated with a set of pixels in the plurality of pixels;
   causing at least one additional color channel to be associated with each pixel in the set of pixels, the at least one additional color channel not being relied on to define pixel color, such that each pixel in the set of pixels has associated therewith (1) one or more color channels that define pixel color and (2) at least one additional color channel that is not being relied on to define pixel color; and
   assigning the graphics primitive type to each pixel in the set of pixels by causing the at least one additional color channel of each pixel in the set of pixels to be mapped to the graphics primitive type, whereby the computing device supports an image format that describes a type of content being described by each pixel in the set of pixels through assignment of the graphics primitive type to the at least one additional color channel for each pixel in the set of pixels.

2. A method as described in claim 1, wherein the image data includes vectorized content having one or more graphics primitives and the processed image data is a bitmap.

3. A method as described in claim 1, wherein the graphics primitive type is an image, glyph, text, vector, or a stroked line.

4. A method as described in claim 1, further comprising:
   identifying a plurality of blocks in the processed image data; and
   associating a block primitive identifier to at least one said block indicating one or more types of graphics primitives included in the at least one said block.

5. A method as described in claim 4, wherein the associating is performed responsive to a determination that the at least one said block includes a graphics primitive type other than an image.

6. A method as described in claim 4, wherein the associating is performed responsive to a determination that the at least one said block includes more than one graphics primitive type.

7. A method as described in claim 4, wherein the block is configured as a band.

8. A method as described in claim 1, further comprising associating a global primitive identifier to the processed image data indicating that the processed image data includes one or more types of graphics primitives.

9. A method as described in claim 1, the method further comprising:
assigning a blending value to a first pixel in the plurality of pixels, the blending value indicating an amount of contribution that a group of different graphics primitive types contributed in forming the first pixel.

10. A method as described in claim 9, wherein the image data includes a plurality of layers, each layer in the plurality of layers having a corresponding graphics primitive type included within the group of different graphics primitive types.

11. The method of claim 1, wherein a second set of pixels has associated therewith a second graphics primitive type, and wherein the method further includes:
rendering the set of pixels and rendering the second set of pixels, wherein the set of pixels is rendered differently than the second set of pixels, the set of pixels being rendered by a first rendering type that is based on the graphics primitive type, the second set of pixels being rendered by a second rendering type that is based on the second graphics primitive type.

12. The method of claim 11, wherein causing the at least one additional color channel to be associated with the graphics primitive type includes:
mapping the graphics primitive type to a first color included within the at least one additional color channel.

13. A system comprising:
one or more processors; and
one or more computer-readable hardware storage media having stored thereon computer-executable instructions that are executable by the one or more processors to cause the system to perform operations comprising:
receiving image data that includes a plurality of pixels, wherein each pixel in the plurality of pixels has associated therewith one or more color channels that define a color for said each corresponding pixel in the plurality of pixels;
using the processed image data to determine a graphics primitive type that is associated with a set of pixels in the plurality of pixels;
causing at least one additional color channel to be associated with each pixel in the set of pixels, the at least one additional color channel not being relied on to define pixel color, such that each pixel in the set of pixels has associated therewith (1) one or more color channels that define pixel color and (2) at least one additional color channel that is not being relied on to define pixel color;
assigning the graphics primitive type to each pixel in the set of pixels by causing the at least one additional color channel of each pixel in the set of pixels to be mapped to the graphics primitive type, whereby the system supports an image format that describes a type of content being described by each pixel in the set of pixels through assignment of the graphics primitive type to the at least one additional color channel for each pixel in the set of pixels; and
rendering the pixels in the set, wherein the rendering is based at least in part on the defined type of graphics primitive for the pixels in the set and the defined color as described by the one or more color channels that define pixel color.

14. A system as described in claim 13, wherein the rendering is performed for output to an archive or by a printer or display device.

15. A system as described in claim 13, wherein the computer-executable instructions further cause the system to recognize a block primitive identifier associated with at least one said block that indicates one or more types of graphics primitives are included in the at least one said block and responsive to the recognizing of the one or more types of graphics primitives, performing the rendering for the at least one said block as optimized based on the indicated one or more types of graphics primitives.

16. A system as described in claim 15, wherein the block primitive identifier indicates that the at least one said block includes a plurality of types of graphics primitives.

17. A system as described in claim 13, wherein the computer-executable instruction further cause the system to recognize a global primitive identifier associated with the image data indicating one or more types of graphics primitives included in the image data and responsive to the recognizing, performing the rendering for the image data as optimized based on the indicated one or more types of graphics primitives.

18. A system as described in claim 17, wherein the global primitive identifier indicates that the image data includes a plurality of types of graphics primitives.

19. The system of claim 13, wherein the processed image data also has associated therewith a global primitive identifier that indicates all graphic primitive types included in the processed image data, the global primitive identifier being metadata included within a header associated with the processed image data, whereby at least some processing of the processed image data can be skipped when a desired graphics primitive type is not included in the header.

20. One or more hardware storage devices having stored thereon computer-executable instructions that are executable by one or more processors of a computing system to cause the computer system to:
receive image data that includes a plurality of pixels, wherein each pixel in the plurality has associated therewith one or more color channels that define a color for said each corresponding pixel in the plurality of pixels;
use the processed image data to determine a graphics primitive type that is associated with a set of pixels in the plurality of pixels;
cause at least one additional color channel to be associated with each pixel in the set of pixels, the at least one additional color channel not being relied on to define pixel color, such that each pixel in the set of pixels has associated therewith (1) one or more color channels that define pixel color and (2) at least one additional color channel that is not being relied on to define pixel color;
assign the graphics primitive type to each pixel in the set of pixels by causing the at least one additional color channel of each pixel in the set of pixels to be mapped to the graphics primitive type, whereby the computer system supports an image format that describes a type of content being described by each pixel in the set of pixels through assignment of the graphics primitive type to the at least one additional color channel for each pixel in the set of pixels; and rendering the pixels in the set, wherein the rendering is based at least in part on the defined type of graphics primitive for the pixels in the set and the defined color as described by the one or more color channels that define pixel color.

21. The one or more hardware storage devices of claim 20, wherein the one or more color channels that define the color for each corresponding pixel in the plurality are red, green, and blue color channels.

22. The one or more hardware storage devices of claim 20, wherein the graphics primitive type is an image, glyph, text, vector, or a stroked line.

23. The one or more hardware storage devices of claim 20, wherein the image data is a bitmap.

* * * * *